(12) United States Patent
Kim et al.

(10) Patent No.: US 9,203,490 B2
(45) Date of Patent: Dec. 1, 2015

(54) METHOD AND APPARATUS FOR TRANSMITTING CHANNEL STATUS INFORMATION IN WIRELESS COMMUNICATION SYSTEM

(75) Inventors: Hyungtae Kim, Anyang-si (KR); Daewon Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 13/983,977

(22) PCT Filed: Apr. 20, 2012

(86) PCT No.: PCT/KR2012/003065
§ 371 (c)(1),
(2), (4) Date: Aug. 6, 2013

(87) PCT Pub. No.: WO2012/148136
PCT Pub. Date: Nov. 1, 2012

(65) Prior Publication Data
US 2013/0315189 A1 Nov. 28, 2013

Related U.S. Application Data

(60) Provisional application No. 61/480,379, filed on Apr. 20, 2012, provisional application No. 61/509,547, filed on Jul. 19, 2011, provisional application No. 61/537,032, filed on Sep. 20, 2011.

(51) Int. Cl.
*H04W 4/00* (2009.01)
*H04B 7/04* (2006.01)
(Continued)

(52) U.S. Cl.
CPC .............. *H04B 7/0456* (2013.01); *H04B 7/024* (2013.01); *H04B 7/0478* (2013.01); *H04L 1/0026* (2013.01); *H04L 1/0031* (2013.01); *H04W 24/10* (2013.01); *H04B 7/0469* (2013.01); *H04B 7/0486* (2013.01); *H04B 7/063* (2013.01); *H04B 7/0632* (2013.01); *H04B 7/0639* (2013.01); *H04L5/0035* (2013.01); *H04L 5/0055* (2013.01); *H04L 5/0073* (2013.01)

(58) Field of Classification Search
None
See application file for complete search history.

(56) References Cited

U.S. PATENT DOCUMENTS 8,369,429 B2 *   2/2013   Koo et al. .................... 375/260
2010/0202311 A1 *   8/2010   Lunttila et al. ............... 370/252
(Continued)

FOREIGN PATENT DOCUMENTS

KR   10-2009-0128343 A   12/2009
KR   10-2010-0091585 A   8/2010
(Continued)

*Primary Examiner* — Anh-Vu Ly
(74) *Attorney, Agent, or Firm* — Birch, Stewart, Kolasch & Birch, LLP

(57) ABSTRACT

The present invention relates to a wireless communication system, and more specifically to a method and an apparatus for transmitting channel status information. According to the present invention, a method for enabling a terminal to transmit channel status information (CSI) with respect to cooperative transmission in the wireless communication system, includes the steps of: determining a first precoding matrix indicator (PMI) for a first cell and a second PMI for a second cell; and transmitting the CSI including the first PMI and the second PMI, wherein the CSI is determined on the basis of a coupled precoding matrix in which the first precoding matrix corresponding to the first PMI is coupled with the second precoding matrix corresponding to the second PMI, and the coupled precoding matrix can be determined by a first coupling type or a second coupling type.

14 Claims, 8 Drawing Sheets

(51) Int. Cl.
   *H04L 1/00*   (2006.01)
   *H04B 7/02*   (2006.01)
   *H04W 24/10*  (2009.01)
   *H04B 7/06*       (2006.01)
   *H04L 5/00*       (2006.01)

(56) References Cited

U.S. PATENT DOCUMENTS

2010/0273514 A1    10/2010   Koo et al.
2010/0322176 A1*   12/2010   Chen et al. .................... 370/329
2010/0322351 A1*   12/2010   Tang et al. .................... 375/316
2011/0080965 A1*   4/2011    Liu et al. ...................... 375/260
2012/0020230 A1*   1/2012    Chen et al. .................... 370/252
2012/0087423 A1    4/2012    Ko et al.
2012/0093089 A1    4/2012    Park et al.
2013/0003788 A1*   1/2013    Marinier et al. ............... 375/219
2013/0273931 A1*   10/2013   Lunttila et al. ............. 455/452.2

FOREIGN PATENT DOCUMENTS

KR    10-2010-0100578 A    9/2010
KR    10-2010-0138845 A    12/2010
WO    WO 2011/020235 A1    2/2011

* cited by examiner

FIG. 5
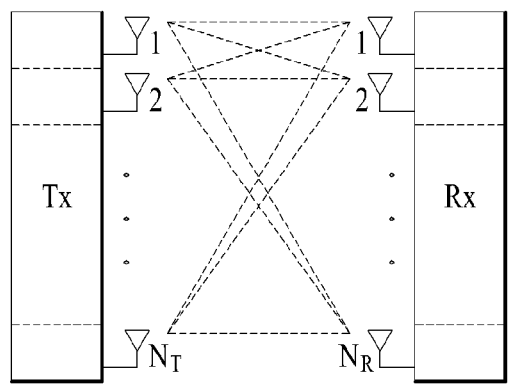
(a)
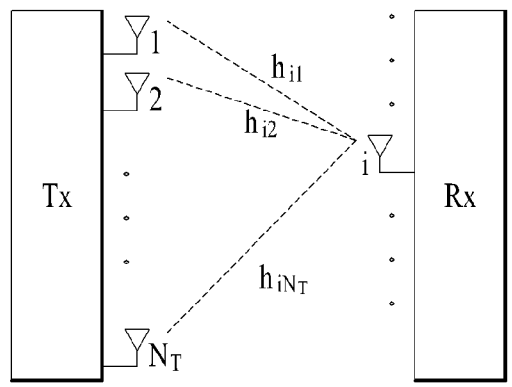
(b)

METHOD AND APPARATUS FOR TRANSMITTING CHANNEL STATUS INFORMATION IN WIRELESS COMMUNICATION SYSTEM

CROSS-REFERENCE TO RELATED APPLICATIONS

This application is the National Phase of PCT/KR2012/003065 filed on Apr. 20, 2012, which claims priority under 35 U.S.C. 119(e) to U.S. Provisional Application Nos. 61/480,379 filed on Apr. 29, 2011, 61/509,547 filed on Jul. 19, 2011, and 61/537,032 filed on Sep. 20, 2011, all of which are hereby expressly incorporated by reference into the present application.

TECHNICAL FIELD

The present invention relates to a wireless communication system and, more specifically, to a method and apparatus for transmitting channel status information.

BACKGROUND ART

Multiple Input Multiple Output (MIMO) increases the efficiency of data transmission and reception using multiple transmit antennas and multiple receive antennas. A receiver receives data through multiple paths when multiple antennas are used, whereas the receiver receives data through a single antenna path when a single antenna is used. Accordingly, MIMO can increase data transmission rate and throughput while also improving coverage.

To increase multiplexing gain of MIMO, channel status information (CSI) can be fed back from a MIMO receiver to be used at a MIMO transmitter. The receiver can determine the CSI by performing channel measurement using a predetermined reference signal (RS) from the transmitter.

DISCLOSURE

Technical Problem

An object of the present invention devised to solve the problem lies in a method for a receiver to feed back more accurate CSI to a plurality of transmitters when cooperative MIMO transmission is performed between the plurality of transmitter and the receiver.

The technical problems solved by the present invention are not limited to the above technical problems and those skilled in the art may understand other technical problems from the following description.

Technical Solution

The object of the present invention can be achieved by providing a method for a terminal to transmit channel status information (CSI) with respect to cooperative transmission in a wireless communication system, the method including: determining a first precoding matrix indicator (PMI) for a first cell and a second PMI for a second cell; and transmitting CSI including the first PMI and the second PMI, wherein the CSI is determined on the basis of a precoding matrix obtained by combining a first precoding matrix corresponding to the first PMI with a second precoding matrix corresponding to the second PMI, wherein the precoding matrix is determined by a first or second combination type.

In another aspect of the present invention, provided herein is a terminal transmitting CSI with respect to cooperative transmission in a wireless communication system, including: a reception module for receiving a downlink signal from an eNB; a transmission module for transmitting an uplink signal to the eNB; and a processor for controlling the terminal including the reception module and the transmission module, wherein the processor is configured to determine a first precoding matrix indicator (PMI) for a first cell and a second PMI for a second cell and to transmit CSI including the first PMI and the second PMI through the transmission module, wherein the CSI is determined on the basis of a precoding matrix obtained by combining a first precoding matrix corresponding to the first PMI with a second precoding matrix corresponding to the second PMI, wherein the precoding matrix is determined by a first or second combination type.

The following is commonly applicable to embodiments of the present invention.

The first combination type may define a combination of the first and second precoding matrices in the column direction and a correspondence between column vectors of the first precoding matrix and column vectors of the second precoding matrix.

The correspondence between the column vectors may be predetermined or information representing the correspondence between the column vectors may be additionally transmitted by the terminal.

When a first transmission rank of the first cell is higher than a second transmission rank of the second cell, a matrix obtained by adding a zero vector corresponding to a difference between the first and second transmission ranks to the second precoding matrix may be combined with the first precoding matrix.

The first combination type may define the combined precoding matrix for a transmission rank higher than a maximum transmission rank supported by a codebook.

The terminal may additionally determine and transmit a third PMI for the first cell and a fourth PMI for the second cell. In this case, the first combination type may define arrangement of a first combined precoding matrix obtained by combining the first precoding matrix with the second precoding matrix in the column direction and a second combined precoding matrix obtained by combining the third precoding matrix with the fourth precoding matrix in the column direction.

The first combination type may define arrangement of the first combined precoding matrix obtained by combining the first precoding matrix with the second precoding matrix in the column direction and a second combined precoding matrix composed of null vectors for column vectors of the first combined precoding matrix in the row direction.

The second combination type may define arrangement of the first and second precoding matrices in the row direction and a combination of the column vectors of the first and second precoding matrices with zero vectors in the column direction.

The column vectors of the first precoding matrix may be higher vectors and may be combined with the zero vectors corresponding to lower vectors in the column direction and the column vectors of the second precoding matrix may be lower vectors and may be combined with the zero vectors corresponding to higher vectors in the column direction.

The first combination type may define joint transmission of one or more data streams by the first and second cells according to cooperative transmission.

The second combination type may define transmission of one or more data streams by the first or second cell according to cooperative transmission.

One of the first and second combination types may be predetermined or information representing the first or second combination type may be additionally transmitted by the terminal.

The first combination type may be applied when a transmission rank of the cooperative transmission is lower than a predetermined reference rank and the second combination type may be applied when the transmission rank of the cooperative transmission exceeds the reference rank.

The CSI may be calculated on the basis of one or more transmit power loads of the first or second cell.

Phase rotation values respectively multiplied by the column vectors of the second precoding matrix may be additionally transmitted by the terminal.

The above description and the following detailed description of the present invention are exemplary and are for the purpose of additional explanation of the claims.

Advantageous Effects

According to the present invention, it is possible to provide a method a receiver to feed back more accurate CSI to a plurality of transmitters performing cooperative MIMO transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a configuration of a wireless communication system having multiple antennas;

BEST MODE

Figure 1:
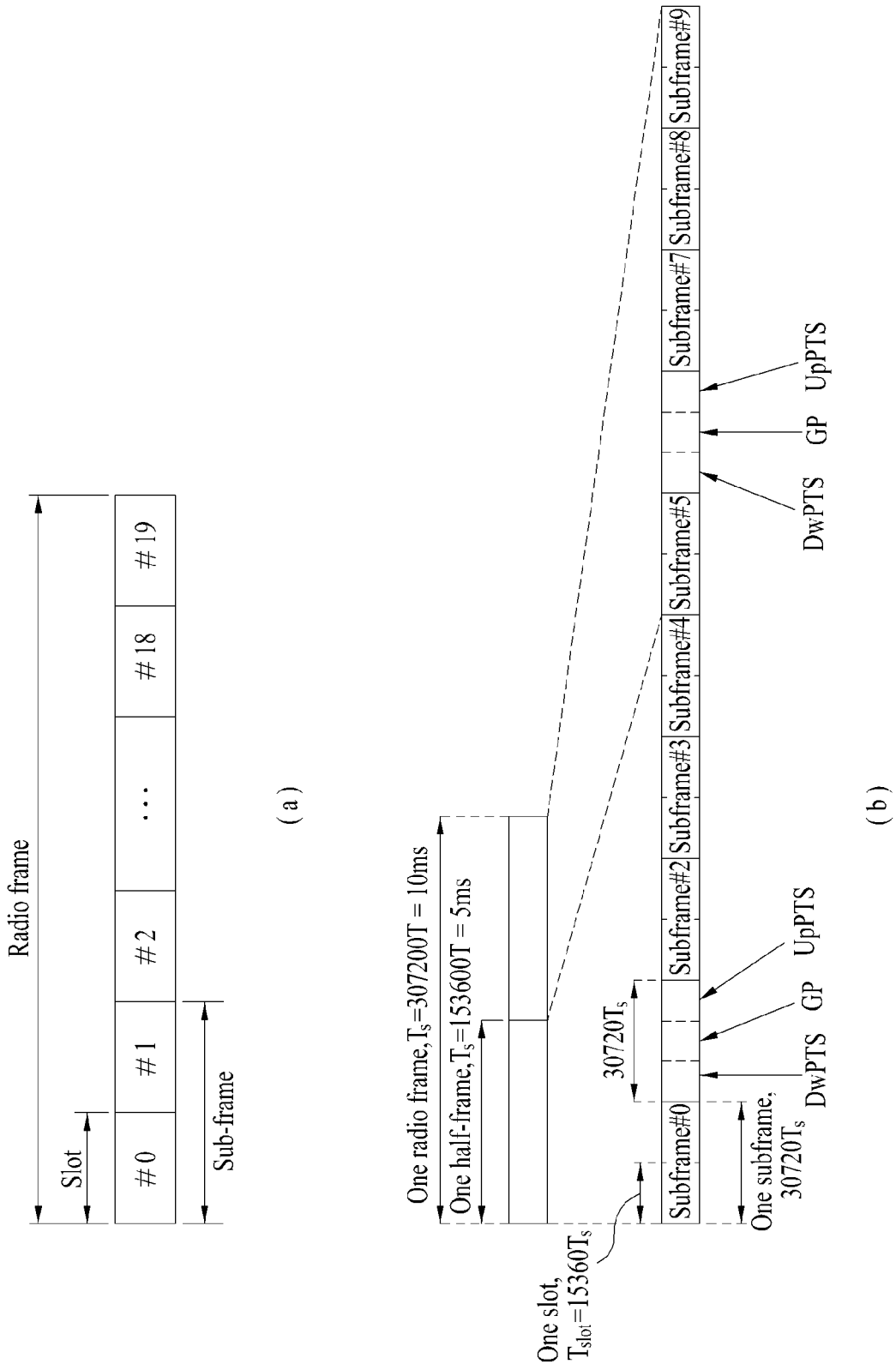
FIG. 1 illustrates a radio frame structure.

The following embodiments are proposed by combining constituent components and characteristics of the present invention according to a predetermined format. The individual constituent components or characteristics should be considered as optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
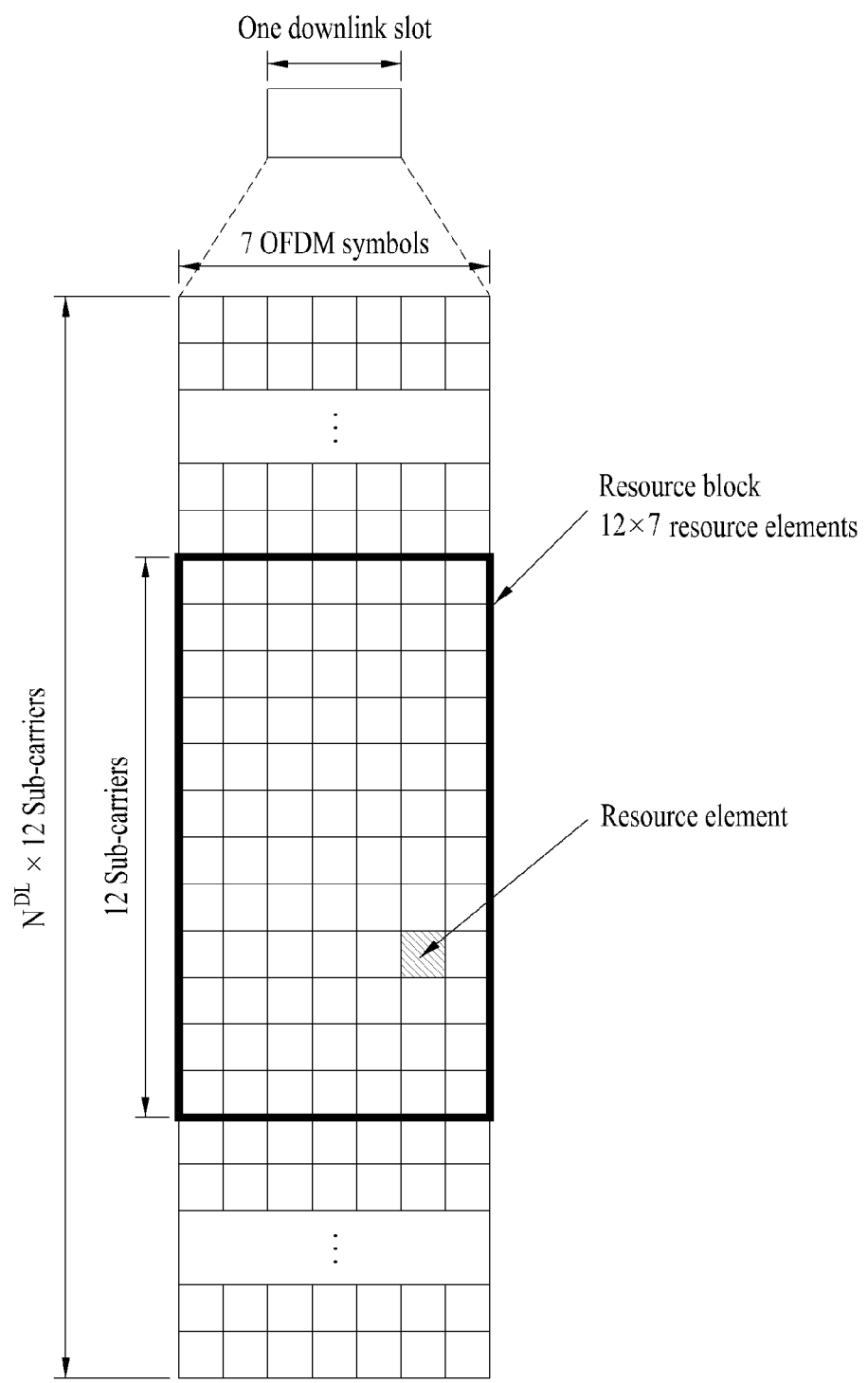
FIG. 2 illustrates a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, $N^{DL}$ depends on a downlink transmission bandwidth. An uplink slot may have the same structure as a downlink slot.

Figure 3:
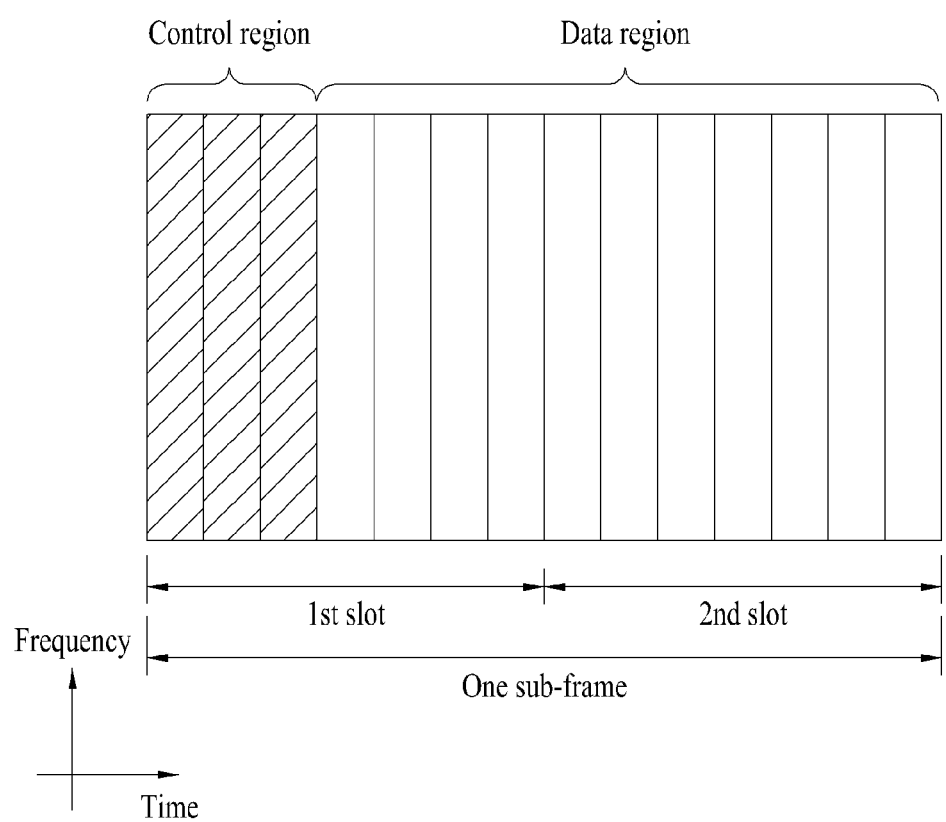
FIG. 3 illustrates a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
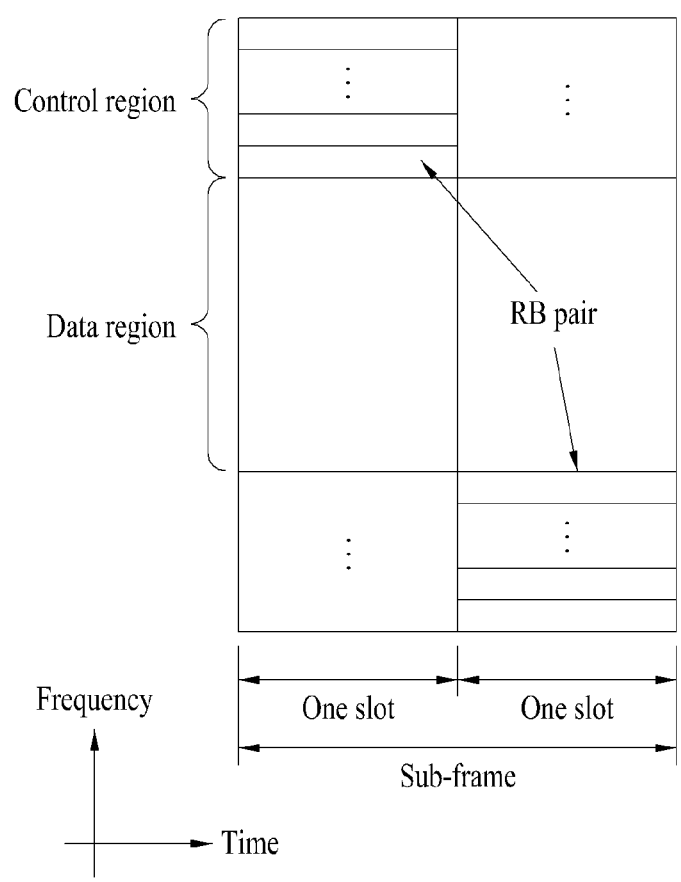
FIG. 4 illustrates an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \qquad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots, y_{N_n}$ may be represented as the following vector.

$$y = [y_1, y_2, \ldots, y_{n_n}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \qquad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R) \quad \text{[Equation 11]}$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Downlink Channel Status (CSI) Feedback

MIMO can be categorized into an open-loop scheme and a closed-loop scheme. The open-loop scheme performs MIMO transmission at a transmitter without feedback of CSI from a MIMO receiver, whereas the closed-loop scheme performs MIMO transmission at the transmitter using feedback of CSI from the MIMO receiver. In closed-loop MIMO, each of the transmitter and the receiver can perform beamforming based on CSI to obtain MIMO Tx antenna multiplexing gain. The transmitter (e.g. eNB) can allocate an uplink control channel or an uplink shared channel to the receiver (e.g. UE) such that the receiver can feed back CSI.

CSI fed back may include a rank indicator (RI), a precoding matrix index (PMI) and a channel quality indictor (CQI).

The RI indicates information about a channel rank. The channel rank represents a maximum number of layers (or streams) through which different pieces of information can be transmitted through the same time-frequency resource. The RI is determined by long term fading of a channel, and thus the RI can be fed back to an eNB at a longer period than the PMI and CQI.

The PMI is information about a precoding matrix used for transmission from a transmitter and is a value in which spatial characteristics of a channel are reflected. Precoding refers to mapping a transport layer to a transmit antenna. A layer-to-antenna mapping relation can be determined by a precoding matrix. The PMI indicates a precoding matrix index of an eNB preferred by a UE based on a metric such as signal-interference plus noise ratio (SINR). To reduce feedback overhead of precoding information, the transmitter and receiver can share a codebook including precoding matrices and only an index indicating a specific precoding matrix in the codebook can be fed back.

The CQI indicates channel quality or channel intensity. The CQI can be represented as a predetermined MCS combination. That is, a fed back CQI index indicates a corresponding modulation scheme and a code rate. The CQI represents a value in which a reception SINR that can be obtained when an eNB configures a spatial channel using the PMI is reflected.

In a system supporting an extended antenna configuration (e.g. LTE-A), additional multi-user diversity is obtained using multi-user MIMO (MU-MIMO). When an eNB performs downlink transmission using CSI fed back by one of multiple UEs, it is necessary to prevent downlink transmission from interfering with other UEs since an interference channel is present between UEs multiplexed in the antenna domain in MU-MIMO. Accordingly, MU-MIMO requires more accurate CSI feedback than single user MIMO (SU-MIMO).

A new CSI feedback scheme that improves CSI composed of the RI, PMI and CQI can be applied in order to measure and report more accurate CSI. For example, precoding information fed back by a receiver can be indicated by a combination of two PMIs. One (first PMI) of the two PMIs is long term and/or wideband information and may be denoted as W1. The other PMI (second PMI) is short term and/or subband information and may be denoted as W1. A final PMI can be determined by a combination (or function) of W1 and W2. For example, if the final PMI is W, W can be defined as W=W1*W2 or W=W2*W1.

Here, W1 reflects frequency and/or temporal average characteristics of a channel. In other words, W1 can be defined as CSI reflecting characteristics of a long-term channel in the time domain, characteristics of a wideband channel in the frequency domain or characteristics of a long-term and wideband channel. To simply represent these characteristics of W1, W1 is referred to as long term-wideband CSI (or long term-wideband PMI) in this specification.

W2 reflects instantaneous channel characteristics compared to W1. In other words, W2 can be defined as CSI reflecting characteristics of a short-term channel in the time domain, characteristics of a subband channel in the frequency domain or characteristics of a short-term and subband channel. To simply represent these characteristics of W2, W2 is referred to as short term-subband CSI (or short term-subband PMI) in this specification.

To determine a final precoding matrix W from two different pieces of information (e.g. W1 and W2) representing channel states, it is necessary to configure separate codebooks (i.e. a first codebook for W1 and a second codebook for W2) composed of precoding matrices representing the information. A codebook configured in this manner may be called a hierarchical codebook. Determination of a final codebook using the hierarchical codebook is called hierarchical codebook transformation.

A codebook can be transformed using a long-term covariance matrix of a channel, represented by Equation 12, as exemplary hierarchical codebook transformation.

$$W = \text{norm}(W1\,W2) \quad \text{[Equation 12]}$$

In Equation 12, W1 (long term-wideband PMI) denotes an element (i.e. codeword) constituting a codebook (e.g. first codebook) generated to reflect long term-wideband channel information. That is, W1 corresponds to a precoding matrix included in the first codebook that reflects the long term-wideband channel information. W2 (short term-subband PMI) represents a codeword constituting a codebook (e.g. second codebook) generated to reflect short term/subband channel information. That is, W2 corresponds to a precoding matrix included in the second codebook that reflects the short term-subband channel information. W is a codeword of a transformed final codebook and norm(A) denotes a matrix in which the norm of each column of matrix A is normalized to 1.

W1 and W2 may have structures as represented by Equation 13.

$$W1(i) = \begin{bmatrix} X_i & 0 \\ 0 & X_i \end{bmatrix} \quad \text{[Equation 13]}$$

$$W2(j) = \overbrace{\begin{bmatrix} e_M^k & e_M^l & \cdots & e_M^m \\ \alpha_j e_M^k & \beta_j e_M^l & \cdots & \gamma_j e_M^m \end{bmatrix}}^{r\ columns} \text{(if rank} = r\text{)}$$

In Equation 13, W1 can be defined as a block diagonal matrix and blocks correspond to the same matrix $X_i$. A block $X_i$ can be defined as a (Nt/2)×M matrix. Here, Nt denotes the number of Tx antennas. $e_M^p$ (p=k, l, ..., m) is an M×1 vector wherein a p-th element of M vector elements represents 1 and other elements represent 0. When W1 is multiplied by $e_M^p$, a p-th column is selected from columns of W1 and thus this vector can be called a selection vector. The number of vectors fed back at a time to represent a long term-wideband channel increases as M increases, to thereby improve feedback accuracy. However, the codebook size of W1 fed back with low frequency decreases and the codebook size of W2 fed back with high frequency increases as M increases, increasing feedback overhead. That is, there is a tradeoff between feedback overhead and feedback accuracy. Accordingly, M can be determined such that feedback overhead is not excessively increased and appropriate feedback accuracy is maintained. As to W2, $\alpha_j$, $\beta_j$ and $\gamma_j$ are predetermined phase values. In Equation 13, 1≤k, l, m≤M and k, l and m are integers.

The codebook structure represented by Equation 13 uses a cross polarized antenna configuration and reflects correlation characteristics of a channel, generated when antenna spacing is narrow (when a distance between neighboring antennas is less than half a signal wavelength). For example, cross polarized antenna configurations may be represented as shown in Table 1.

TABLE 1

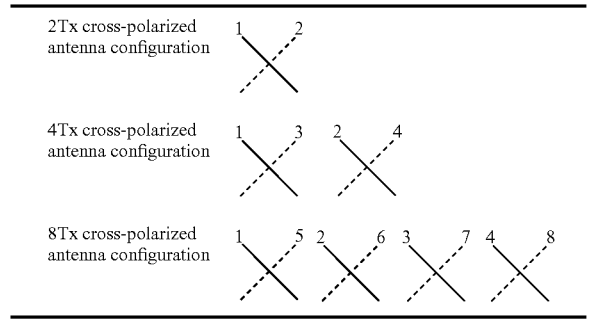

In Table 1, an 8 Tx cross polarized antenna configuration is composed of two antenna groups having orthogonal polarizations. Antennas belonging to antenna group 1 (antennas 1, 2, 3 and 4) may have the same polarization (e.g. vertical polarization) and antennas belonging to antenna group 2 (antennas 5, 6, 7 and 8) may have the same polarization (e.g. horizontal polarization). The two antenna groups are co-located. For example, antennas 1 and 5 can be co-located, antennas 2 and 6 can be co-located, antennas 3 and 7 can be co-located and antennas 4 and 8 can be co-located. In other words, antennas in an antenna group have the same polarization as in a uniform linear array (ULA) and a correlation between antennas in an antenna group has a linear phase increment characteristic. Furthermore, a correlation between antenna groups has a phase rotation characteristic.

Since a codebook is composed of values obtained by quantizing a channel, it is necessary to design the codebook by reflecting actual channel characteristics therein. To describe reflection of actual channel characteristics in codewords of a codebook designed as represented by Equation 13, a rank-1 codebook is exemplified. Equation 14 represents determination of a final codeword W by multiplying codeword W1 by codeword W2 in the case of rank 1.

$$W1(i) * W2(j) = \begin{bmatrix} X_i(k) \\ \alpha_j X_i(k) \end{bmatrix}$$ [Equation 14]

In Equation 14, the final codeword is represented by a vector of Nt×1 and is composed of an upper vector $X_i(k)$ and a lower vector $\alpha_j X_i(k)$ which respectively represent correlations between horizontal antenna groups and vertical antenna groups of cross polarized antennas. $X_i(k)$ is preferably represented as a vector (e.g. DFT matrix) having linear phase increment in which correlation between antennas in each antenna group is reflected.

When the above-described codebook is used, higher channel feedback accuracy can be achieved compared to a case in which a single codebook is used. Single-cell MU-MIMO can be performed using high accuracy channel feedback and thus high accuracy channel feedback is necessary for CoMP operation. For example, plural eNBs cooperatively transmit the same data to a specific UE in CoMP JT operation, and thus this system can be theoretically regarded as a MIMO system in which plural antennas are geographically distributed. That is, even when MU-MIMO operation is performed in CoMP JT, high channel information accuracy is necessary to avoid interference between co-scheduled UEs. In addition, CoMP CB also requires accurate channel information in order to avoid interference of a neighboring cell, applied to a serving cell.

CSI Feedback Scheme for Cooperative Transmission

When a plurality of transmitters performs cooperative transmission (e.g. the above-described CoMP) to a single receiver (e.g. UE), the receiver needs to report more accurate CSI to the plurality of transmitters. The transmitters may be configured such that the receiver considers the transmitters as separate cells (e.g. different cell IDs are respectively assigned to the transmitters) or as transmit antennas of the same cell (e.g. the same cell ID is assigned to the transmitters). While the following description is based on a multi-cell CSI reporting scheme, the present invention is not limited thereto and the principle of the present invention can be equally applied to a method of reporting CSI to each transmitter when plural transmitters constitute a single cell.

Cells participating in cooperative transmission may transmit a reference signal (RS) for CSI measurement/calculation performed by a receiver. The reference signal may correspond to a cell-specific RS (CRS) and/or a CSI-RS, for example, which enables channel estimation for each antenna port. For example, CRSs with respect to different antenna ports can be discriminated from one another by being mapped to different resource elements of the antenna ports. Furthermore, the CRS is transmitted in all subframes in principle. CSI-RSs with respect to different antenna ports are mapped to different resource elements of the antenna ports or respectively allocated orthogonal codes even when mapped to the same resource element, and thus CSI-RSs of different antenna ports can be discriminated from one another. In addition, the CSI-RS can be transmitted in subframes corresponding to a predetermined period instead of all subframes. That is, the CSI-RS can be transmitted only in predetermined subframes determined according to various CSI-RS configurations.

The receiver measures channels from the plurality of transmitters and reports CSI (CQI/PMI/RI) for the measured channels. The CSI may be individual information about each transmitter or information about a composite channel of the channels from all transmitters. The CSI for cooperative transmission, measured/calculated at the receiver, may be reported to a serving cell.

For example, the receiver can measure an RS from each cell, determine a preferred precoding matrix with respect to each cell and report the preferred precoding matrix. Here, cells may have the same transmission rank or different transmission ranks. In addition, a weight considering a relative difference (phase difference and/or transmit power difference) between transmitters may be used for constructive interference between signals precoded and transmitted by the transmitters. Information about the weight may be fed back by the receiver.

In case of conventional single-cell CSI report, a precoding matrix corresponding to a PMI reported by a receiver is configured as a basis indicating a preferred signal space of the receiver. Accordingly, the order of column vectors constituting a precoding matrix does not affect the capacity of a channel from a transmitter to a receiver. However, the order of column vectors of a precoding matrix is significant in multi-cell CSI reporting.

Specifically, in multi-cell CSI reporting, a receiver can report PMIs for a plurality of transmitters to a serving cell. Here, a precoding matrix corresponding to a PMI for each of the plurality of transmitters may include one or more column vectors. In case of cooperative transmission according to a plurality of transmitters, a precoding vector applied to a transport layer can be represented as a vector corresponding a combination of column vectors used for each transmitter to transmit a corresponding layer.

Figure 6:
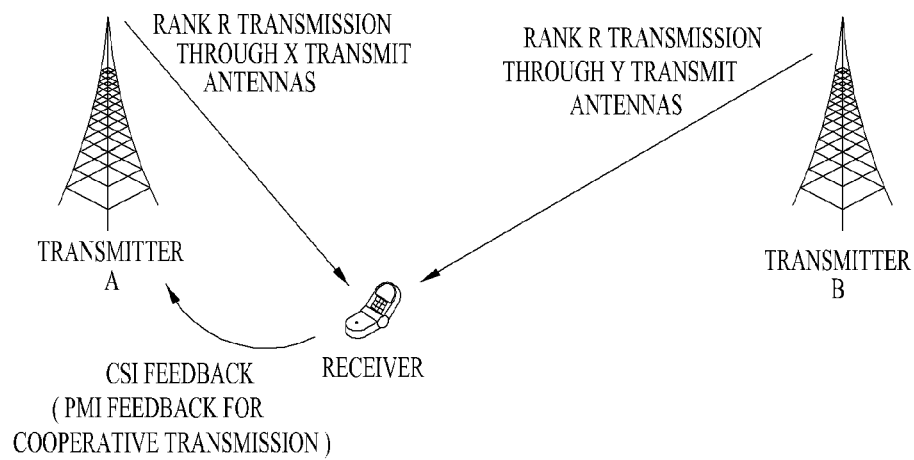
FIG. 6 illustrates exemplary CSI feedback based on the same rank in cooperative transmission.

FIG. 6 illustrates exemplary CSI feedback based on the same rank in cooperative transmission. It can be assumed that a precoding matrix used for cooperative transmission as shown in FIG. 6 is defined as represented by Expression 15.

$$\begin{bmatrix} p_{1,1} & p_{1,2} & \cdots & p_{1,R} \\ p_{2,1} & p_{2,2} & \cdots & p_{2,R} \\ \vdots & \vdots & \ddots & \vdots \\ p_{X,1} & p_{X,2} & \cdots & p_{X,R} \\ p_{X+1,1} & p_{X+1,2} & \cdots & p_{X+1,R} \\ p_{X+2,1} & p_{X+2,2} & \cdots & p_{X+2,R} \\ \vdots & \vdots & \ddots & \vdots \\ p_{X+Y,1} & p_{X+Y,2} & \cdots & p_{X+Y,R} \end{bmatrix} \quad \text{[Equation 15]}$$

Here, $p_{i,j}$ ($1 \leq i \leq X+Y$, $1 \leq j \leq R$) corresponds to an element of the precoding matrix. In the exemplary precoding matrix of Expression 15, a column corresponds to a layer and a row corresponds to an antenna (or antenna port). For example, it can be assumed that two transmitters (e.g. transmitters A and B) perform cooperative transmission, the transmitter A performs transmission through X antennas (antennas 1, 2, ..., X, X≥1), the transmitter B performs transmission through Y antennas (antennas X+1, X+2, X+Y, Y≥1), R layers are transmitted according to precoding weights $p_{1,1}$, $p_{1,2}$, ..., $p_{1,R}$ through antenna 1 (i.e., the first row of Expression 15) of the transmitter A, and R layers are transmitted according to precoding weights $p_{X+1,1}$, $p_{X+1,2}$, ..., $p_{X+1,R}$ through antenna 1 (i.e., the (X+1)-th row of Expression 15) of the transmitter B.

Expression 15 may be regarded as a precoding matrix on the assumption that cooperative transmission according to a plurality of transmitters corresponds to transmission of R layers through X+Y antennas. For example, higher column vectors (i.e. $p_{i,1}$ (i=1, ..., X)) from among column vectors (i.e. $p_{i,1}$ (i=1, ..., X+Y)) corresponding to the first layer (i.e. R=1) transmitted according to cooperative transmission correspond to precoding vectors used by the transmitter A and lower column vectors (i.e. $p_{i,1}$ (i=X+1, ..., X+Y)) correspond to precoding vectors used by the transmitter B.

That is, the precoding matrix of Expression 15 may correspond to a supermatrix configured by combining the precoding matrix with respect to the transmitter A and the precoding matrix with respect to the transmitter B in the column direction and the precoding matrices with respect to the transmitters A and B may correspond to submatrices of the precoding matrix of Expression 15.

The receiver participating in cooperative transmission reports a PMI corresponding to a preferred precoding matrix with respect to each transmitter. In this case, a precoding matrix for cooperative transmission according to multiple transmitters can be determined on the basis of combination relationship between column vectors constituting a precoding matrix for a transmitter and column vectors constituting a precoding matrix for another transmitter.

For example, it is assumed that the receiver receives data according to cooperative transmission by the transmitters A and B and reports a rank-2 PMI for each cell. In addition, it is assumed that the receiver reports a PMI corresponding to a precoding matrix of $[v_{1,1}\ v_{1,2}]$ to the transmitter A and reports a PMI corresponding to a precoding matrix of $[v_{2,1}\ v_{2,2}]$ to the transmitter B. Here, $v_{i,j}$ represents a column vector (for example, $v_{1,1}$ corresponds to the column vector composed of elements $p_{i,1}$ (i=1, ..., X)) in Expression 15 and $v_{2,1}$ corresponds to the column vector composed of elements $p_{i,1}$ (i=X+1, ..., X+Y)) in Expression 15). In this case, the precoding vector with respect to the first layer in cooperative transmission can be represented as a combination of the first column vector of the precoding matrix for the transmitter A and the first column vector of the precoding matrix for the transmitter B. That is, the first column vector of the precoding matrix in cooperative transmission can be represented as $[v_{1,1}^T\ a_1 * v_{2,1}^T]^T$ ($a_1$ being a weight for correcting a relative difference (e.g. power difference and/or phase difference) between the two transmitters). Otherwise, the precoding vector with respect to the first layer in cooperative transmission can be represented as a combination of the first column vector of the precoding matrix for the transmitter A and the second column vector of the precoding matrix for the transmitter B. That is, the first column vector of the precoding matrix in cooperative transmission can be represented as $[v_{1,1}^T\ a_1 * v_{2,2}^T]^T$.

As described above, a precoding matrix for cooperative transmission can be determined based on combination relationship between column vectors constituting a precoding matrix for a transmitter and column vectors constituting a precoding matrix for another transmitter in multi-cell CSI feedback. Accordingly, for efficient and accurate cooperative transmission, it is necessary to determine the relationship between column vectors of precoding matrices with respect to transmitters and to define operations of transmitters and a receiver according to the relationship. To achieve this, the present invention proposes various embodiments.

While a case in which a plurality of transmitters has the same transmission rank or different transmission ranks is assumed in the following embodiments, the present invention is not limited thereto. That is, it is apparent that description of a case in which the transmitters have the same transmission rank is applicable to a case in which the transmitters have different transmission ranks although only one case is described for clarity.

Embodiment 1

In the present embodiment, a column vector combined with an n-th column vector of a precoding matrix with respect to each of plural transmitters participating in cooperative transmission can be used as a precoding vector for an n-th data stream (or layer) in cooperative transmission. It is assumed that precoding matrices with respect to the plural transmitters have the same rank value in the present embodiment.

According to the present embodiment, a combination of precoding matrices with respect to the transmitters is fixed. In this case, a receiver can calculate and report a CQI value that can be achieved when a precoding matrix (i.e. precoding matrix for cooperative transmission) determined on the basis of combination relationship between column vectors is used. A transmitter can determine a combination of the precoding vector thereof and a precoding vector of another transmitter without additional feedback information from the receiver.

For example, a precoding vector applied to the n-th data stream (or layer) in cooperative transmission according to two cells may be represented as $[v_{1,n}^T\ v_{2,n}^T]^T$. That is, $v_{1,1}^T$ for cell A can be combined with $v_{2,1}^T$ for cell B at all times and $v_{1,2}^T$ for cell A can be combined with $v_{2,2}^T$ for cell B at all times.

In addition, the weight $a_1$ reflecting a difference (e.g. power difference and/or phase difference) between transmitters may be fed back from the receiver to the transmitters. In this case, a precoding vector applied to the n-th data stream (or layer) in cooperative transmission according to two cells may be represented as $[v_{1,n}^T a_1 * v_{2,n}^T]^T$.

Embodiment 2

In the present embodiment, the receiver can additionally report information about the order of column vectors constituting a precoding matrix for each transmitter participating in cooperative transmission. It is assumed that precoding matrices for the transmitters have the same rank value in the present embodiment.

For example, the receiver can report a PMI for a transmitter and, simultaneously, notify the transmitter which column vector of a precoding matrix corresponding to the PMI is combined with which column vector of a precoding matrix for another transmitter using an additional feedback bit. Here, the order of column vectors of a precoding matrix for one of the plural transmitters may be a basis and the transmitter may correspond to a serving cell.

For example, in cooperative transmission according to two cells, the receiver can report a PMI corresponding to a rank-2 precoding matrix $[v_{1,1} \ v_{1,2}]$ to cell A and report a PMI corresponding to a rank-2 precoding matrix $[v_{2,1} \ v_{2,2}]$ to cell B. In this case, the receiver can report information about the order of column vectors of the corresponding precoding matrix using one feedback bit in addition to CSI to cell B. For example, if the additional feedback bit is 0, the feedback bit can indicate that the first column vector of the precoding matrix for cell B is combined with the first column vector of the precoding matrix for cell A (that is, a precoding vector applied to the first layer of a precoding matrix for cooperative transmission can be represented as $[v_{1,1}^T \ v_{2,1}^T]^T$). When the additional feedback bit is 1, the feedback bit can indicate that the second column vector of the precoding matrix for cell B is combined with the first column vector of the precoding matrix for cell A (that is, the precoding vector applied to the first layer of the precoding matrix for cooperative transmission can be represented as $[v_{1,1}^T \ v_{2,2}^T]^T$).

In addition, the weight $a_1$ reflecting a difference (e.g. power different and/or phase difference) between transmitters may be fed back from the receiver to the transmitters. In this case, when the feedback bit with respect to the order of column vectors is 0, the precoding vector applied to the first layer of the precoding matrix for cooperative transmission can be represented as $[v_{1,1}^T \ a_1 * v_{2,1}^T]^T$. If the feedback bit with respect to the order of column vectors is 1, the precoding vector applied to the first layer of the precoding matrix for cooperative transmission can be represented as $[v_{1,1}^T \ a_1 * v_{2,2}^T]^T$.

In the present embodiment, when a precoding matrix with respect to a specific cell from among plural cells participating in cooperative transmission is combined with a precoding matrix with respect to another cell (other cells), an indicator for indicating whether column permutation is applied to the precoding matrix for the specific cell may be additionally fed back. Accordingly, the receiver can additionally report an indicator (that may be 2 bits or more incase of rank 3 or more) with respect to column permutation for the precoding matrix of each transmitter even in the case of cooperative transmission of rank 3 or more.

Embodiment 3

In the present embodiment, in CSI report for multi-cell cooperative transmission, PMI reporting can be performed on the assumption that predetermined column permutation is applied to some of the codewords (i.e. precoding matrices defined in a feedback codebook) constituting the feedback codebook. The present embodiment is based on the assumption that precoding matrices for plural transmitters have the same rank value.

For example, codewords of a predetermined codebook can be divided into two groups according to whether column permutation is applied or not. When a UE reports a PMI with respect to cell B, if the PMI indicates a codeword (i.e. precoding matrix) belonging to a group to which column permutation is not applied, it can be considered that the first column vector of the corresponding precoding matrix is combined with the first column vector of the precoding matrix for cell A. If the PMI indicates a codeword (i.e. precoding matrix) belonging to a group to which column permutation is applied, it can be considered that the second column vector of the corresponding precoding matrix is combined with the first column vector of the precoding matrix for cell A.

To achieve this, the serving cell can signal, to the receiver, precoding matrices to which column permutation is applied and precoding matrices to which column permutation is not applied in a specific feedback codebook through higher layer signaling (e.g. RRC signaling). To reduce control signaling overhead, precoding matrices to which column permutation is applied and precoding matrices to which column permutation is not applied in a specific feedback codebook may be previously determined and shared between the transmitters and receiver.

Table 2 illustrates a codebook including 16 4 Tx (4 transmit antennas) rank-2 precoding matrices defined in 3GPP LTE. A description will be given of an example of determining a precoding matrix to which column permutation is applied in a specific codebook on the basis of the codebook shown in Table 2.

TABLE 2

4Tx Rank-2 codebook $$W_0 = \frac{1}{2}\begin{bmatrix} 1 & 1 \\ 1 & -1 \\ 1 & -1 \\ 1 & 1 \end{bmatrix} \quad W_1 = \frac{1}{2}\begin{bmatrix} 1 & j \\ -j & 1 \\ -1 & j \\ j & 1 \end{bmatrix}$$

$$W_2 = \frac{1}{2}\begin{bmatrix} 1 & -1 \\ -1 & 1 \\ 1 & 1 \\ -1 & -1 \end{bmatrix} \quad W_3 = \frac{1}{2}\begin{bmatrix} 1 & -j \\ j & 1 \\ -1 & -j \\ -j & 1 \end{bmatrix}$$

$$W_4 = \frac{1}{2}\begin{bmatrix} 1 & \frac{-1+j}{\sqrt{2}} \\ \frac{1-j}{\sqrt{2}} & -j \\ -j & \frac{-1-j}{\sqrt{2}} \\ \frac{-1-j}{\sqrt{2}} & 1 \end{bmatrix} \quad W_5 = \frac{1}{2}\begin{bmatrix} 1 & \frac{1+j}{\sqrt{2}} \\ \frac{-1-j}{\sqrt{2}} & j \\ j & \frac{1-j}{\sqrt{2}} \\ \frac{1-j}{\sqrt{2}} & 1 \end{bmatrix}$$

$$W_6 = \frac{1}{2}\begin{bmatrix} 1 & j \\ \frac{-1+j}{\sqrt{2}} & \frac{1+j}{\sqrt{2}} \\ -j & 1 \\ \frac{1+j}{\sqrt{2}} & \frac{1-j}{\sqrt{2}} \end{bmatrix} \quad W_7 = \frac{1}{2}\begin{bmatrix} 1 & -j \\ \frac{1+j}{\sqrt{2}} & \frac{-1+j}{\sqrt{2}} \\ j & 1 \\ \frac{-1+j}{\sqrt{2}} & \frac{-1-j}{\sqrt{2}} \end{bmatrix}$$

TABLE 2-continued

4Tx Rank-2 codebook $$W_8 = \frac{1}{2}\begin{bmatrix} 1 & 1 \\ 1 & 1 \\ -1 & 1 \\ -1 & 1 \end{bmatrix} \quad W_9 = \frac{1}{2}\begin{bmatrix} 1 & j \\ -j & -1 \\ 1 & -j \\ -j & 1 \end{bmatrix}$$

$$W_{10} = \frac{1}{2}\begin{bmatrix} 1 & -1 \\ -1 & -1 \\ -1 & 1 \\ 1 & 1 \end{bmatrix} \quad W_{11} = \frac{1}{2}\begin{bmatrix} 1 & 1 \\ j & -j \\ 1 & 1 \\ j & -j \end{bmatrix}$$

$$W_{12} = \frac{1}{2}\begin{bmatrix} 1 & 1 \\ 1 & 1 \\ 1 & -1 \\ -1 & 1 \end{bmatrix} \quad W_{13} = \frac{1}{2}\begin{bmatrix} 1 & -1 \\ 1 & 1 \\ -1 & 1 \\ 1 & 1 \end{bmatrix}$$

$$W_{14} = \frac{1}{2}\begin{bmatrix} 1 & 1 \\ -1 & 1 \\ 1 & 1 \\ 1 & -1 \end{bmatrix} \quad W_{15} = \frac{1}{2}\begin{bmatrix} 1 & -1 \\ -1 & 1 \\ -1 & -1 \\ -1 & -1 \end{bmatrix}$$

The codebook of Table 2 includes 16 codewords $W_i$ (i=0, 1, . . . , 15). If the codebook of Table 2 is used for CSI feedback from the receiver to the plural transmitters, a precoding matrix used for cooperative transmission according to the plural transmitters can be determined by Equations 16 and 17.

$$\overline{W}_{ijk} = \begin{bmatrix} W_i \\ \alpha_k W_j \end{bmatrix} \quad \text{[Equation 16]}$$

$$\overline{W}_{ijk} = \begin{bmatrix} W_i(1) & W_i(2) \\ \alpha_k(1)W_j(1) & \alpha_k(2)W_j(2) \end{bmatrix} \quad \text{[Equation 17]}$$

In Equations 16 and 17, $W_i$ denotes an i-th codeword, $W_i(m)$ denotes an m-th column vector of the i-th codeword, $W_j$ a j-th codeword and $W_j(m)$ represents the m-th column vector of the j-th codeword. In addition, $\alpha_k, \alpha_k(1), \alpha_k(2)$ are complex numbers and can correspond to phase rotation values, for example. That is, in Equations 16 and 17, the precoding matrix used for cooperative transmission can be determined as a combination of precoding matrices in which phase rotation has been applied to $W_i$ for cell A and $W_j$ for cell B. Equation 16 shows application of phase rotation irrespective of the column index (i or j) and Equation 17 shows application of phase rotation by columns.

In the codebook of Table 2, second column vectors of codewords $W_0$ and $W_2$ are linearly dependent. If the precoding matrix used for cooperative transmission is determined as Equations 16 and 17 by codeword $W_0$ for cell A and codeword $W_2$ for cell B, diversity of codewords included in the codebook is deteriorated. Specifically, second column vectors of codewords $$\begin{bmatrix} W_0 \\ \alpha_k W_0 \end{bmatrix} \text{ and } \begin{bmatrix} W_0 \\ \alpha_k W_2 \end{bmatrix}$$

overlap. If the codebook for cooperative transmission is generated using $W_2'$, obtained by permuting positions of column vectors of $W_2$, instead of $W_2$, codeword diversity can be secured. Similarly, the same problem due to linear dependency of the second column vector may be generated between $W_{12}$ and $W_{15}$ and between $W_1$ and $W_{11}$. Accordingly, the codebook for cooperative transmission can be generated using $W_{12}$ and $W_{15}'$ (column-permuted matrix of $W_{15}$) or $W_1$ and $W_{11}'$ (column-permuted matrix of $W_{11}$) according to the present embodiment.

Even in cooperative transmission of rank 3 or higher, a codebook for cooperative transmission can be generated on the assumption that column permutation is applied to some codewords in a specific codebook, as described above.

Embodiments 1, 2 and 3 describe CSI feedback schemes (particularly, PMI feedback schemes) in cooperative transmission (e.g. CoMP JT) when a plurality of transmitters has the same transmission rank. A description will be given of a method for reporting CSI in consideration of a difference between transmitters (e.g. cells constituting a CoMP set) participating in cooperative transmission (e.g. CoMP).

Embodiment 4

In the present embodiment, a receiver calculates/reports CSI on the assumption that plural transmitters can have the same transmission rank or different transmission ranks. Since channels from transmitters to a specific receiver are independent of each other, the transmitter may have the same transmission rank or different transmission ranks. Furthermore, in CoMP operation such as dynamic transmitter selection, it is preferable to report CSI based on the same rank value or different rank values for different transmitters.

In CoMP JT, reporting of CSI based on different ranks may be limited because a method of generating a precoding matrix for cooperative transmission needs to be additionally defined since precoding matrices for respective transmitters have different numbers of column vectors when the precoding matrix for cooperative transmission is generated by combining precoding matrices based on different ranks.

For example, when plural transmitters have different rank values, the receiver can report, to a transmitter (e.g. serving cell), additional information representing how a precoding matrix for a transmitter having a relatively small rank value is combined with a precoding matrix for a transmitter having a relatively large rank value.

Figure 7:
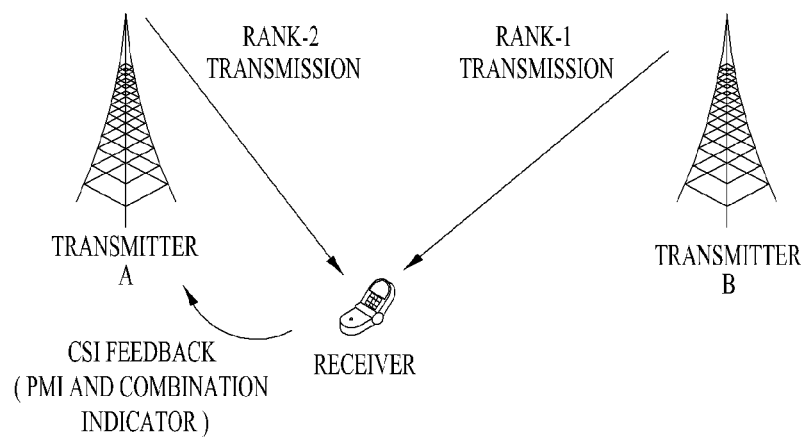
FIG. 7 illustrates exemplary CSI feedback based on different ranks in cooperative transmission.

FIG. 7 illustrates exemplary CSI feedback based on different ranks in cooperative transmission. FIG. 7 assumes that a receiver is provided with services from transmitter A and transmitter B according to CoMP, the best transmission rank value from transmitter A is 2, the best transmission rank value from transmitter B is 1 and the receiver CSI with respect to the transmitters based on the rank values. In this case, the receiver can feed back an indicator (e.g. combination indicator) indicating a best way of combining a precoding matrix (i.e. rank-1 precoding matrix) corresponding to a PMI for transmitter B and a precoding matrix (i.e. rank-2 precoding matrix) corresponding to a PMI for transmitter A for CoMP JT operation while feeding back PMIs (e.g. PMIs for transmitters A and B) for cooperative transmission.

For example, it is assumed that the receiver feeds back a PMI corresponding to [$v_1$ $v_2$] to transmitter A and feeds back a PMI corresponding to $w_1$ to transmitter B. Here, $v_1, v_2$ and $w_1$ correspond to precoding column vectors (i.e. rank-1 precoding vectors). The receiver can report whether a best precoding matrix for CoMP JT is $$\begin{bmatrix} v_1 & v_2 \\ w_1 & 0 \end{bmatrix} \text{ or } \begin{bmatrix} v_1 & v_2 \\ 0 & w_1 \end{bmatrix}$$

using the combination indicator. Here, 0 denotes a column vector in which all elements correspond to 0, which may be called a zero vector.

In addition, the receiver can additionally feed back information (which can be represented as a complex number $\alpha_1$, for example) representing a phase difference between signals simultaneously transmitted from the two transmitters to the transmitter. In this case, the receiver can report whether a precoding matrix that the receiver prefers for cooperative transmission is $$\begin{bmatrix} v_1 & v_2 \\ \alpha_1 w_1 & 0 \end{bmatrix} \text{ or } \begin{bmatrix} v_1 & v_2 \\ 0 & \alpha_1 w_1 \end{bmatrix}$$

by feeding back the combining indicator and the phase difference information.

In other words, the receiver may transmit information indicating how each column vector constituting a precoding matrix corresponding to a PMI for a transmitter (e.g. transmitter B) having a relatively low transmission rank is combined with a column vector of a precoding matrix corresponding to PMI for a transmitter (e.g. transmitter A) having a relatively high transmission rank to be used to transmit a specific layer according to cooperative transmission by a plurality of transmitters. Furthermore, the receiver may transmit information about column permutation of column vectors of a precoding matrix corresponding to a PMI for a transmitter having a relatively low transmission rank and additional zero vectors (the number of zero vectors corresponds to the highest transmission rank and the transmission rank of the corresponding transmitter).

A description will be given of an example of extending the above-described example to a higher rank case.

For example, it is assumed that a receiver feeds back a PMI corresponding to a rank-3 precoding matrix [$v_1\ v_2\ v_3$] to a transmitter (e.g. serving cell) having Nt1 transmit antennas and feeds back a PMI corresponding to a rank-2 precoding matrix [$w_1\ w_2$] to a transmitter (e.g. cooperative cell) having Nt2 transmit antennas ($v_1$, $v_2$ and $v_3$ being Nt1×1 vectors, $w_1$ and $w_2$ being Nt2×1 vectors) in CoMP JT performed by two transmitters. In this case, a precoding matrix corresponding to a combination (i.e. supermatrix) of a precoding matrix with respect to a transmitter (i.e. cooperative cell) having a low transmission rank (i.e. rank 2) and a precoding matrix with respect to a transmitter (i.e. serving cell) having a high transmission rank (i.e. rank 3) can be determined as an element of a set represented by Expression 18 according to column vector combination.

$$\left\{ \begin{bmatrix} v_1 & v_2 & v_3 \\ w_1 & w_2 & 0 \end{bmatrix}, \begin{bmatrix} v_1 & v_2 & v_3 \\ w_1 & 0 & w_2 \end{bmatrix}, \begin{bmatrix} v_1 & v_2 & v_3 \\ 0 & w_1 & w_2 \end{bmatrix}, \right.$$
$$\left. \begin{bmatrix} v_1 & v_2 & v_3 \\ w_2 & w_1 & 0 \end{bmatrix}, \begin{bmatrix} v_1 & v_2 & v_3 \\ w_2 & 0 & w_1 \end{bmatrix}, \begin{bmatrix} v_1 & v_2 & v_3 \\ 0 & w_2 & w_1 \end{bmatrix} \right\}$$ [Expression 18]

The receiver can signal information indicating a preferred element (i.e. a precoding matrix combination) of the set of Expression 18 to a transmitter (e.g. serving cell). Alternatively, it is possible to predetermine a specific precoding matrix combination corresponding to an element of the set of Expression 18 as a precoding matrix for CoMP JT (statically or semi-statically) between the receiver and transmitters and use the predetermined precoding matrix for CoMP JT without additionally signaling a PMI, instead of dynamically signaling the PMI for CoMP JT.

In addition, in the case of coherent JT compensating for a phase difference between signals simultaneously transmitted from transmitters in cooperative transmission, the receiver can additionally signal information representing the phase difference. In the above-described example, phase rotation values applied to column vectors $w_1$ and $w_2$ of the precoding matrix for the transmitter having a low transmission rank can be respectively represented by complex numbers $\alpha_1$ and $\alpha_2$. In this case, a precoding matrix for cooperative transmission can be determined as an element of a set represented by Expression 19.

$$\left\{ \begin{bmatrix} v_1 & v_2 & v_3 \\ \alpha_1 w_1 & \alpha_2 w_2 & 0 \end{bmatrix}, \begin{bmatrix} v_1 & v_2 & v_3 \\ \alpha_1 w_1 & 0 & \alpha_2 w_2 \end{bmatrix}, \right.$$
$$\begin{bmatrix} v_1 & v_2 & v_3 \\ 0 & \alpha_1 w_1 & \alpha_2 w_2 \end{bmatrix}, \begin{bmatrix} v_1 & v_2 & v_3 \\ \alpha_2 w_2 & \alpha_1 w_1 & 0 \end{bmatrix},$$
$$\left. \begin{bmatrix} v_1 & v_2 & v_3 \\ \alpha_2 w_2 & 0 & \alpha_1 w_1 \end{bmatrix}, \begin{bmatrix} v_1 & v_2 & v_3 \\ 0 & \alpha_2 w_2 & \alpha_1 w_1 \end{bmatrix} \right\}$$ [Expression 19]

A specific one of a plurality of transmitters can be set as a reference (or preferred) transmitter with respect to transmission rank. That is, a transmission rank for the reference transmitter from among the plurality of transmitters can be preferentially determined and transmission ranks for other transmitters can be restrictively determined. The determined reference transmitter may be shared between the receiver and transmitters. For example, the reference transmitter can be a serving cell or a primary cell (PCell) (PCell may correspond to a serving cell providing important control information in RRC connected configuration in case of carrier aggregation). Restrictive determination of a transmission rank means that the transmission rank is fixed to a predetermined value (e.g. 1) or set to a value lower than the transmission rank for the reference transmitter.

Embodiment 5

In the present embodiment, a receiver calculates/reports CSI on the assumption that a plurality of transmitters may have the same transmit power load or different transmit power loads. A transmit power load refers to the ratio of transmit power for a specific receiver to total transmit power (for all receivers) of a transmitter.

Figure 8:
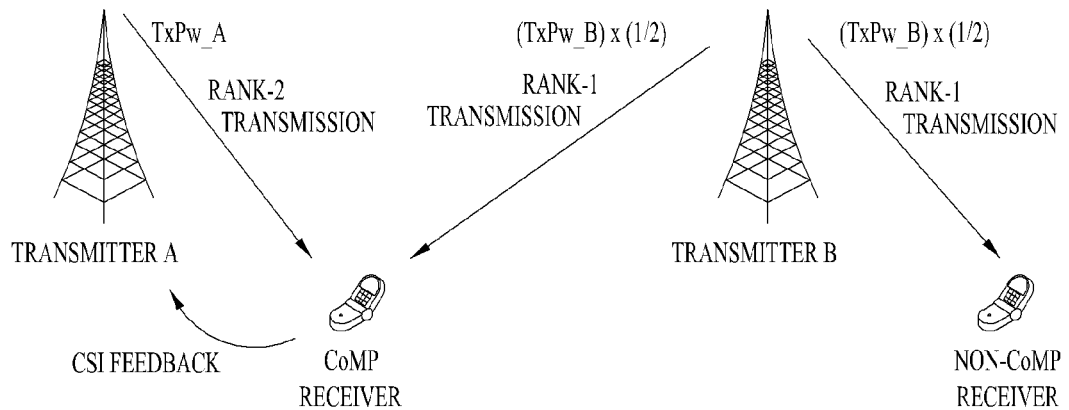
FIG. 8 illustrates exemplary CSI feedback based on different transmit power loads in cooperative transmission.

FIG. 8 illustrates exemplary CSI feedback based on different transmit power loads in cooperative transmission. In FIG. 8, it is assumed that transmitters A and B perform cooperative transmission (e.g. CoMP transmission), transmitter A transmits a signal to a CoMP receiver using total transmit power TxPw_A and transmitter B transmits a signal to the CoMP receiver using half of total transmit power TxPw_B. In this case, it can be considered that a transmit power load of transmitter A for the CoMP receiver is 1 and a transmit power load of transmitter B for the CoMP receiver is 0.5. Transmitter B can use the remaining half transmit power for another receiver (e.g. non-CoMP receiver) (i.e. transmitter B can support MU-MIMO for a plurality of receivers).

FIG. 8 illustrates a case in which a cell performs cooperative transmission and, at the same time, carries out MU- MIMO for an additional receiver (i.e. a receiver other than the receiver with respect to cooperative transmission) belonging to the cell. That is, a cell uses a portion of transmit power instead of total transmit power for cooperative transmission.

For example, operation illustrated in FIG. 8 corresponds to a case in which a portion of transmit power of transmitter B is used for transmission (i.e. MU-MIMO operation) with respect to an additional receiver when the transmission rank of transmitter B is lower than that of transmitter A. In this case, transmitter B can maintain all ranks thereof (e.g. the sum of rank 1 for the CoMP receiver and rank 1 for the non-CoMP receiver) irrespective of a transmission rank value for the CoMP receiver or maintain the ranks identical to the rank (e.g. rank 2 for the CoMP receiver) of transmitter A. While transmitters A and B have different ranks in the present embodiment, the present invention is not limited thereto and can also be applied to a case in which one of transmitters participating in cooperative transmission uses a portion of transmit power thereof for cooperative transmission even if the transmitters have the same rank.

As described above, transmitters participating in cooperative transmission have different transmit power loads, in general. For example, in the case of CoMP JT in which transmitters simultaneously transmit signals, the transmitters use different transmit powers for receivers other than a CoMP receiver and thus a transmit power load of a transmitter for the CoMP receiver is different from transmit power loads of other transmitters.

In this case, the CoMP receiver can calculate/report CSI on the assumption that the transmitters provide services to the CoMP receiver using different transmit power loads. For example, the CoMP receiver can calculate an RI/PMI/CQI for a specific transmitter from among transmitters participating in cooperative transmission on the assumption that the specific transmitter transmits a signal to the CoMP receiver using only a portion of transmit power thereof.

To achieve this, each transmitter participating in cooperative transmission can signal information on the transmit power load thereof to the receiver through higher layer signaling (e.g. RRC signaling) and/or a physical control channel. A transmit power load with respect to cooperative transmission may be information indicating the ratio of power of a transmitter, used for cooperative transmission, to total transmit power of the transmitter when a portion of the total transmit power is used for cooperative transmission and the remaining power is used for receivers other than a receiver corresponding to a target of cooperative transmission. For example, information on the transmit power load may be transmitted in the form of the ratio of data (e.g. PDSCH) transmit power to reference signal (e.g. CRS or CSI-RS) transmit power.

If each transmitter participating in cooperative transmission has an independent CSI-RS configuration (that is, CSI-RS transmission timing is independently set at each transmitter), each transmitter can inform the receiver of a portion of the total transmit power, used for actual transmission, for CSI-RS configuration.

Alternatively, when transmitters participating in cooperative transmission correspond to different antenna ports of CRSs or CSI-RSs transmitted in the same subframe, each transmitter can inform the receiver of a portion of transmit power for the corresponding antenna port, which is used for actual transmission.

It is possible to use CSI, which is calculated and reported by a first receiver on the assumption that a specific transmitter serves the first receiver using only a portion of transmit power thereof, for scheduling of a second receiver when the specific transmitter uses the remaining transmit power to serve the second receiver. For example, it is possible to determine a precoding matrix used for scheduling of the second receiver while maintaining attributes (e.g. CM (constant modulus) configured such that elements of a precoding matrix have predetermined values without including 0, orthogonality of the elements of the precoding matrix, etc.) of column vectors of a precoding matrix corresponding to a PMI reported by the first receiver.

Embodiment 6

In the present embodiment, a precoding matrix for cooperative transmission is determined based on the sum of transmission ranks of a plurality of transmitters. The above-mentioned embodiments relate to a case in which a data stream (or layer) is transmitted by a plurality of transmitters, whereas the present embodiment relates to a case in which a data stream is transmitted by a single transmitter at all times.

For example, it assumed that two transmitters perform CoMP JT and a receiver feeds back a PMI corresponding to a rnk-3 precoding matrix $[v_1\ v_2\ v_3]$ to a transmitter (e.g. serving cell) having Nt1 transmit antennas and feeds back a PMI corresponding to a rank-2 precoding matrix $[W_1\ W_2]$ to a transmitter (e.g. cooperative cell) having Nt2 transmit antennas ($v_1$, $v_2$ and $v_3$ being Nt1×1 vectors, $w_1$ and $w_2$ being Nt2×1 vectors). In this case, column vectors constituting the rank-3 precoding matrix for the serving cell may be combined with zero vectors. For example, combined column vectors having the column vectors of the precoding matrix for the serving cell as higher column vectors and the zero vectors as lower column vectors can be determined. Furthermore, column vectors constituting the rank-2 precoding matrix for the cooperative cell may be combined with zero vectors. For example, combined column vectors having the zero vectors as higher column vectors and the column vectors of the precoding matrix for the cooperative cell as lower column vectors and can be determined. A supermatrix can be configured by arranging the combined column vectors in the row direction to determine a rank-5 precoding matrix as represented by Expression 20.

$$\begin{bmatrix} v_1 & v_2 & v_3 & 0 & 0 \\ 0 & 0 & 0 & w_1 & w_2 \end{bmatrix} \quad \text{[Expression 20]}$$

When the precoding matrix for cooperative transmission, as represented by Expression 20, is determined, the transmitters can transmit different data streams (or layers). For example, the serving cell can transmit layers 1, 2 and 3 through beams generated by $v_1$, $v_2$ and $v_3$ and the cooperative cell can transmit layers 4 and 5 through beams generated by $w_1$ and $w_2$.

That is, a method of combining precoding matrices for cooperative transmission according to Embodiment 6 is distinguished from Embodiments 1 to 4. Specifically, Embodiments 1 to 4 assume that a maximum transmission rank of transmission ranks of transmitters participating in cooperative transmission is identical to the transmission rank of cooperative transmission (for this, precoding matrices for the transmitters are combined in the column direction (e.g. combination type of Expression 18)), whereas Embodiment 6 assumes that the sum of transmission ranks of transmitters participating in cooperative transmission is identical to the transmission rank of cooperative transmission (for this, zero vectors are combined with precoding matrices for the transmitters in the column direction and the combination result is arranged in the row direction (e.g. combination type of Expression 20)).

The method according to Embodiment 6 may be selectively applied.

To achieve this, the receiver can report PMIs for respective transmitters and additional information indicating how precoding matrices corresponding to the PMIs are combined (i.e. combination type). For example, the receiver can report, to a transmitter, information indicating whether a precoding matrix is configured according to a maximum rank from among the ranks of the plurality of transmitters or the sum of the ranks of the transmitters. In other words, the receiver can determine whether a precoding matrix for cooperative transmission is configured (e.g. combined in the column direction) according to Embodiment 4 (e.g. Expression 18) or the precoding matrix is configured (e.g. arranged in the row direction) according to Embodiment 6 (e.g. Expression 20) and report the determination result to the corresponding transmitter. Otherwise, whether the precoding matrix is configured according to Embodiment 4 or Embodiment 6 may be predetermined between the receiver and the plurality of transmitters and applied without additional signaling.

Alternatively, the receiver can calculate/report CSI on the assumption that the precoding matrix is configured based on the sum of the ranks of the plurality of transmitters when a predetermined condition is satisfied.

The predetermined condition may be determined according to whether cooperative transmission is performed at a high rank or low rank. Specifically, it can be assumed that the precoding matrix is configured according to the maximum rank of the ranks of the plurality of transmitters (e.g. Embodiment 4). Furthermore, it can be assumed that the precoding matrix is configured according to the sum of the ranks of the plurality of transmitters (e.g. Embodiment 6) only when a rank value calculated by the receiver for cooperative transmission is greater than a predetermined value. For example, it is possible to assume that a precoding matrix such as Expression 20 is configured when a rank value calculated by the receiver for cooperative transmission is greater than a maximum rank that can be represented by a predefined codebook and a precoding matrix such as Expression 18 is configured in other cases.

The predetermined condition may be determined according to whether a data stream (or layer) is received from a plurality of transmitters or a single transmitter. For example, it can be assumed that the precoding matrix is configured according to a maximum rank of the ranks of the plurality of transmitters (e.g. Embodiment 4) when the rank of cooperative transmission is less than 2. This corresponds to a case in which a data stream (or layer) is transmitted by the plurality of transmitters. If the rank of cooperative transmission is greater than 2, it can be assumed that the precoding matrix is configured according to the sum of the ranks of the plurality of transmitters (e.g. Embodiment 6). This corresponds to a case in which a data stream (or layer) is transmitted by a single transmitter at all times. When the rank of cooperative transmission is greater than 2, a single CQI can be determined for a plurality of layers. In addition, when a layer is transmitted by a plurality of transmitters, it is necessary to determine a CQI for a signal corresponding to a combination of the same data transmitted from the plurality of transmitters in the air, and thus determination of a CQI in consideration of both a plurality of layers and a plurality of transmitters requires excessively complicated processing. Therefore, processing load related to CSI calculation can be reduced by limiting the number of layers transmitted by a plurality of transmitters according to the above-described examples.

Embodiment 7

The present embodiment relates to a method of feeding back CSI when a maximum rank of a codebook is lower than a rank suitable for cooperative transmission.

For example, it can be assumed that a PMI for CoMP JT is fed back using a codebook defined for non-CoMP (i.e. single cell) transmission. While the codebook for non-CoMP transmission is defined for up to rank 2, a rank most suitable for CoMP JT (or preferred by the receiver) may be 4. In this case, system performance may not be maximized because only transmission of up to rank 2 is supported although rank-4 transmission is preferable in terms of system performance. Specifically, it is assumed that CoMP JT is performed by a receiver (e.g. UE) having 4 reception antennas, a transmitter (e.g. serving eNB) having 2 transmit antennas and a transmitter (e.g. cooperative eNB) having 2 transmit antennas. An eNB having 2 antennas can include a codebook with a maximum of rank 2 or correctly analyze only a PMI indicating a specific precoding matrix in the codebook. Considering degree of freedom in this example, a maximum rank that can be achieved in cooperative transmission is 4. When the UE feeds back CSI for each of eNBs participating in cooperative transmission, a precoding matrix is determined based on a codebook of up to rank 2 since the number of antennas of each eNB is 2. In this case, a maximum rank achieved by cooperative transmission is limited to 2 according to a combination of transmissions of up to rank 2 of the eNBs. A description will be given of embodiments of a method for supporting a rank exceeding a limited rank for cooperative transmission even when only a codebook of the limited rank is provided.

Embodiment 7-1

Similarly to Embodiment 6 (e.g. Expression 20), a precoding matrix having a rank higher than the rank of the codebook can be configured by combining a column vector of a precoding matrix for each transmitter with a zero vector in the column direction and arranging precoding matrices combined with zero vectors in the row direction.

For example, if two eNBs perform CoMP JT and a UE feeds back a PMI corresponding to a rank-2 precoding matrix $[v_1 \ v_2]$ to an eNB (e.g. serving eNB) having Nt1 transmit antennas and feeds back a PMI corresponding to a rank-2 precoding matrix $[w_1 \ W_2]$ to an eNB (e.g. cooperative eNB) having Nt2 transmit antennas ($v_1$ and $v_2$ being Nt1×1 vectors, $w_1$ and $w_2$ being Nt2×1 vectors), column vectors of the rank-2 precoding matrix for the serving cell can be combined with zero vectors. For example, it is possible to determine column vectors having column vectors of the precoding matrix for the serving cell as higher column vectors and having the zero vectors as lower column vectors. Furthermore, column vectors of the rank-2 precoding matrix for the cooperative cell can be combined with zero vectors. For example, it is possible to determine column vectors having the zero vectors as higher column vectors and having column vectors of the precoding matrix for the cooperative cell as lower column vectors. The column vectors can be arranged in the row direction to configure a supermatrix as a rank-4 precoding matrix as represented by Expression 21.

$$\begin{bmatrix} v_1 & v_2 & 0 & 0 \\ 0 & 0 & w_1 & w_2 \end{bmatrix} \quad \text{[Expression 21]}$$

Embodiment 7-2

A precoding matrix for a data stream (or layer) corresponding to a maximum rank supported by the codebook can be determined by combining precoding matrices corresponding to PMIs for respective transmitters in the column direction, and a precoding matrix corresponding to a data stream (or layer) that exceeds the maximum rank supported by the codebook can be determined to correspond to additional PMIs determined by the receiver.

For example, when an appropriate rank for CoMP JT is 3, a UE can report a PMI based on a rank-2 codebook and additionally report a PMI based on a rank-1 codebook. That is, precoding matrices for first and second data streams (or layers) can be determined as precoding matrices corresponding to PMIs of the rank-2 codebook and a precoding matrix for a third data stream (or layer) can be determined as a precoding matrix corresponding to a PMI of the rank-1 codebook. For example, a rank-2 precoding matrix as represented by Expression 22 can be determined.

$$\begin{bmatrix} v_1 & v_2 & y_1 \\ w_1 & w_2 & z_1 \end{bmatrix} \quad \text{[Expression 22]}$$

In Expression 22, $[v_1 \; v_2]$ and $[y_1]$ are precoding matrices for the serving cell, which respectively correspond to a rank-2 precoding matrix and a rank-1 precoding matrix. In addition, $[w_1 \; w_2]$ and $[z_1]$ are precoding matrices for the cooperative cell, which respectively correspond to a rank-2 precoding matrix and a rank-1 precoding matrix.

As described in Embodiment 2 or 4, a combination of (correspondence between) column vectors of the precoding matrix for the serving eNB and column vectors of the precoding matrix for the cooperative cell may be defined in various manners. The UE can report information (e.g. combination indicator) on a preferred combination relationship selected from various combination relationships on the basis of an SINR or throughput.

In addition, information on a phase difference between signals simultaneously transmitted from a plurality of eNBs in cooperative transmission may be additionally reported in consideration of coherent JT that compensates for the phase difference. For example, complex values (e.g. $\alpha_1$, $\alpha_2$ and $\alpha_3$) respectively multiplied by $w_1$, $w_2$ and $z_1$ in Expression 22 can be reported.

Furthermore, to reduce overhead of feedback of a PMI corresponding to a rank higher than those for existing PMIs, codebook subset restriction can be applied to codebooks for determining precoding matrices for higher ranks. For example, rank-1 precoding matrices (e.g. $[y_1]$ and $[z_1]$) can be selected from a codebook restricted to some precoding matrices (i.e. subsets) of a codebook (e.g. rank-1 codebook) for determining precoding matrices corresponding to higher ranks according to precoding matrices (e.g. $[v_1 \; v_2]$ and $[w_1 \; w_2]$) determined based on a rank-2 codebook. Since the number of selectable precoding matrices is reduced according to codebook subset restriction, a bit size of information representing a PMI corresponding to a higher rank can be decreased.

Embodiment 7-3

The receiver can determine a precoding matrix for a data stream (or layer) of a maximum rank supported by the codebook within the codebook and report a PMI corresponding to the determined precoding matrix. Precoding matrix elements corresponding to a rank higher than the maximum rank supported by the codebook can be determined by a function having precoding matrix elements corresponding to the reported PMI as factors.

For example, when an appropriate rank for CoMP JT is 4, the UE can determine precoding matrices (e.g. $[v_1 \; v_2]$ for the serving eNB and $[w_1 \; w_2]$ for the cooperative eNB) for first and second data streams (or layers) in a rank-2 codebook and report PMIs corresponding to the precoding matrices. In this case, precoding matrices for third and fourth data streams (or layers) can be calculated as null vectors of the precoding matrices $[v_1 \; v_2]$ and $[w_1 \; w_2]$ corresponding to the reported PMIs. In the present invention, a null vector of a predetermined vector (e.g. v) can correspond to a vector orthogonal to the vector v. Since the null vector can be calculated on the basis of vectors of a precoding matrix determined (or reported) in the codebook, information indicating the null vector need not be additionally signaled and the calculated null vector may not be included in the codebook. Accordingly, a precoding matrix for cooperative transmission can be determined by arranging elements of a rank-2 precoding matrix determined in the codebook and precoding matrix elements corresponding to null vectors of the determined rank-2 precoding matrix in the row direction. Expression 23 represents an exemplary precoding matrix for cooperative transmission, determined by a null vector generation function.

$$\begin{bmatrix} v_1 & v_2 & \text{Null}_{R_{JT}-R_{CodeB}}\left(\begin{bmatrix} v_1 & v_2 \\ w_1 & w_2 \end{bmatrix}\right) \\ w_1 & w_2 \end{bmatrix} \quad \text{[Expression 23]}$$

In Expression 23, $R_{JT}$ and $R_{CodeB}$ respectively denote a CoMP JT transmission rank and a maximum rank supportable by the codebook and $\text{Null}_k(A)$ is a function for outputting K null vectors from among null vectors of matrix A.

When the precoding matrix for cooperative transmission is determined as described above, the UE can select precoding matrices (e.g. $[v_1 \; v_2]$ and $[w_1 \; w_2]$) that maximize SINR or throughput when the precoding matrix of Expression 23 is assumed from the codebook and report PMIs corresponding to the selected precoding matrices to the corresponding eNB.

As described in Embodiment 2 or 4, a combination of (or correspondence between) column vectors of the precoding matrix for the serving eNB and column vectors of the precoding matrix for the cooperative cell may be defined in various manners. The UE can report information (e.g. combination indicator) on a preferred combination relationship selected from various combination relationships on the basis of a SINR or throughput.

In addition, the UE can additionally report information on a phase difference between signals simultaneously transmitted from a plurality of eNBs in cooperative transmission in consideration of coherent JT that compensates for the phase difference. For example, complex values (e.g. $\alpha_1$ and $\alpha_2$) respectively multiplied by $w_1$ and $w_2$ in Expression 23 can be reported.

Figure 9:
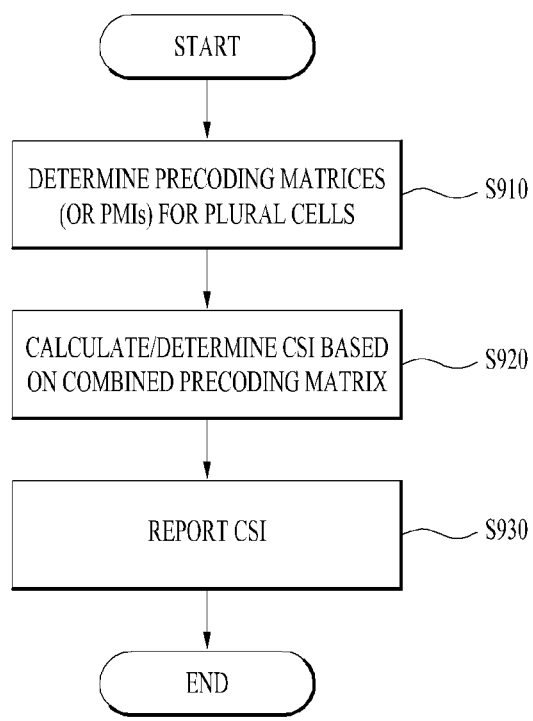
FIG. 9 is a flowchart illustrating a method for transmitting channel status information according to an embodiment of the present invention.

FIG. 9 is a flowchart illustrating a method for transmitting CSI according to an embodiment of the present invention.

A receiver (e.g. UE) with respect to cooperative transmission can determine precoding matrices (or PMIs indicating the precoding matrices) respectively corresponding to a plurality of cells in step S910. For example, in the case of cooperative transmission in which a first cell and a second cell participate, the receiver can determine a first PMI for the first cell and a second PMI for the second cell. The UE can determine preferred PMIs on the basis of channel measurement performed using reference signals (CRSs and/or CSI-RSs) from the cells. For example, the UE can determine a best rank for cooperative transmission, select best precoding matrices (a precoding matrix for the first cell and a precoding matrix for the second cell) that can achieve high SINR and throughput at the determined best rank from a predefined codebook and determine PMIs respectively corresponding to the precoding matrices.

The UE can calculate/determine CSI for cooperative transmission on the assumption that a matrix corresponding to a combination of first and second precoding matrices corresponding to the first and second PMIs is applied to cooperative transmission in step S920. The present invention proposes two combination types as a method of combining the first and second precoding matrices. That is, the CSI for cooperative transmission can be calculated/determined based on a precoding matrix combined according to combination type of the first and second precoding matrices.

The first combination type can define correspondence between column vectors of the first precoding matrix and column vectors of the second precoding matrix when the first and second precoding matrices are combined in the column direction, as described in Embodiments 1 to 5 (e.g. Expression 15). Furthermore, the first combination type may involve a combination method of generating a precoding matrix for a rank higher than a rank supported by a codebook in addition to the method of combining the first and second precoding matrices in the column direction, as described in Embodiment 7-2 (in which precoding matrices corresponding to additional PMIs are arranged in the row direction) and Embodiment 7-3 (in which null vectors of a precoding matrix corresponding to a reported PMI are arranged in the row direction). The first combination type may be defined as joint transmission of a data stream (or layer) by the first and second cells in cooperative transmission.

The second combination type can define a combination of column vectors of the first and second precoding matrices with zero vectors in the column direction while the first and second precoding matrices are arranged in the row direction, as described in Embodiment 6 (e.g. Expression 20). For example, the column vectors of the first precoding matrix can be combined as higher vectors and the zero vectors can be combined as lower vectors in the column direction or the column vectors of the second precoding matrix can be combined as higher vectors and the zero vectors can be combined as higher vectors in the column direction. The second combination type may define transmission of a data stream (or layer) by one of the first and second cells in cooperative transmission.

The CSI (e.g. CQI) calculated/determined based on the combined precoding matrix can be reported to a transmitter (e.g. serving cell) in step S930. Here, the CSI can be calculated/determined in consideration of one or more transmit power loads of the first or second cell. Transmit power loads of the cells can be signaled to the UE per RS and/or per antenna port. The reported CSI may include the first and second PMIs.

The CSI transmission method described with reference to FIG. 9 may be implemented such that the above-described embodiments of the invention can be independently applied thereto or two or more of the embodiments can be simultaneously applied thereto and descriptions of redundant parts are omitted for clarity.

Figure 10:
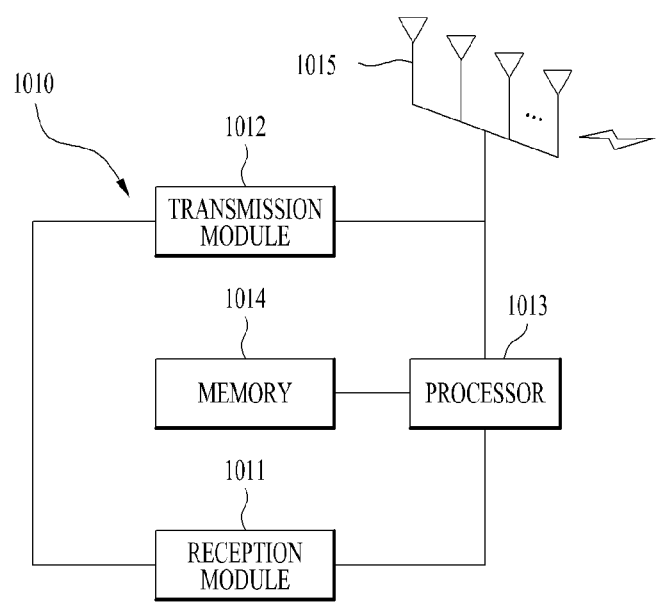
FIG. 10 illustrates a configuration of a transceiver according to an embodiment of the present invention.

FIG. 10 illustrates a configuration of a transceiver according to an embodiment of the present invention.

Referring to FIG. 10, a transceiver 1010 according to an embodiment of the present invention may include a reception module 1011, a transmission module 1012, a processor 1013, a memory 1014 and a plurality of antennas 1015. The reception module 1011 may be configured to receive various signals, data and information from an external device. The transmission module 1012 may be configured to transmit various signals, data and information to the external device. The processor 1013 may control overall operation of the transceiver 1010 and may be configured to execute a function of processing information transmitted/received between the transceiver 1010 and the external device. The memory 1014 may store the processed information for a predetermined time and may be replaced by a component such as a buffer (not shown). The antennas 1015 can support MIMO transmission and reception.

The transceiver 1010 according to an embodiment of the present invention may be configured to report CSI for cooperative transmission. The processor 1013 of the transceiver 1010 can be configured to determine the first PMI for the first cell and the second PMI for the second cell. In addition, the processor 1013 of the transceiver 1010 can be configured to transmit CSI including the first and second PMIs through the transmission module. Here, the CSI can be determined on the basis of a precoding matrix corresponding to a combination of the first precoding matrix corresponding to the first PMI and the second precoding matrix corresponding to the second PMI. The precoding matrix can be determined according to the first or second combination type.

The transceiver 1010 may be implemented such that the above-described embodiments of the invention can be independently applied thereto or two or more of the embodiments can be simultaneously applied thereto and descriptions of redundant parts are omitted for clarity.

The transceiver 1010 shown in FIG. 10 may be a UE or a relay that receives signals from a plurality of cells according to cooperative transmission and feeds back CSI for cooperative transmission.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The above-described embodiments of the present invention can be applied to various mobile communication systems.

The invention claimed is:

1. A method for a terminal to transmit channel status information (CSI) with respect to cooperative transmission in a wireless communication system, the method comprising:
determining a first precoding matrix indicator (PMI) for a first cell and a second PMI for a second cell; and
transmitting CSI including the first PMI and the second PMI,
wherein the CSI is determined based on a precoding matrix obtained by combining a first precoding matrix corresponding to the first PMI with a second precoding matrix corresponding to the second PMI,
wherein the precoding matrix is determined by a first or second type of combination,
wherein the first type of combination defines a combination of the first and second precoding matrices in a column direction and a correspondence between column vectors of the first precoding matrix and column vectors of the second precoding matrix.

2. The method according to claim 1, wherein the correspondence between the column vectors is predetermined or information representing the correspondence between the column vectors is additionally transmitted by the terminal.

3. The method according to claim 1, wherein, when a first transmission rank of the first cell is higher than a second transmission rank of the second cell, a matrix obtained by adding a zero vector corresponding to a difference between the first and second transmission ranks to the second precoding matrix is combined with the first precoding matrix.

4. The method according to claim 1, wherein the first type of combination defines the combined precoding matrix for a transmission rank higher than a maximum transmission rank supported by a codebook.

5. The method according to claim 4, wherein the terminal additionally determines and transmits a third PMI for the first cell and a fourth PMI for the second cell, and
wherein the first type of combination defines arrangement of a first combined precoding matrix obtained by combining the first precoding matrix with the second precoding matrix in the column direction and a second combined precoding matrix obtained by combining the third precoding matrix with the fourth precoding matrix in the column direction.

6. The method according to claim 4, wherein the first type of combination defines arrangement of the first combined precoding matrix obtained by combining the first precoding matrix with the second precoding matrix in the column direction and a second combined precoding matrix composed of null vectors for column vectors of the first combined precoding matrix in a row direction.

7. The method according to claim 1, wherein the second type of combination defines arrangement of the first and second precoding matrices in the in a row direction and a combination of the column vectors of the first and second precoding matrices with zero vectors in the column direction.

8. The method according to claim 7, wherein, the column vectors of the first precoding matrix are higher vectors and are combined with the zero vectors corresponding to lower vectors in the column direction and the column vectors of the second precoding matrix are lower vectors and are combined with the zero vectors corresponding to higher vectors in the column direction.

9. The method according to claim 1, wherein the first type of combination defines joint transmission of one or more data streams by the first and second cells according to cooperative transmission.

10. The method according to claim 1, wherein the type of combination type defines transmission of one or more data streams by the first or second cell according to cooperative transmission.

11. The method according to claim 1, wherein one of the first and second type of combinations is predetermined, information representing the first or second type of combination is additionally transmitted by the terminal, or the first type of combination is applied when a transmission rank of the cooperative transmission is lower than a predetermined reference rank and the second type of combination is applied when the transmission rank of the cooperative transmission exceeds the reference rank.

12. The method according to claim 1, wherein the CSI is calculated based on one or more transmit power loads of the first or second cell.

13. The method according to claim 1, wherein phase rotation values respectively multiplied by the column vectors of the second precoding matrix are additionally transmitted by the terminal.

14. A terminal transmitting channel status information (CSI) with respect to cooperative transmission in a wireless communication system, the terminal comprising:
a reception module configured to receive a downlink signal from an evolved Node B (eNB);
a transmission module con figured to transmit an uplink signal to the eNB; and
a processor configured to control the terminal including the reception module and the transmission module,
wherein the processor is further configured to determine a first precoding matrix indicator (PMI) for a first cell and a second PMI for a second cell and to transmit CSI including the first PMI and the second PMI through the transmission module,
wherein the CSI is determined based on a precoding matrix obtained by combining a first precoding matrix corresponding to the first PMI with a second precoding matrix corresponding to the second PMI,
wherein the precoding matrix is determined by a first or second type of combination, and wherein the first type of combination defines a combination of the first and second precoding matrices in a column direction and a correspondence between column vectors of the first precoding matrix and column vectors of the second precoding matrix.

* * * * *